(12) United States Patent
Conley

(10) Patent No.: US 6,324,009 B1
(45) Date of Patent: Nov. 27, 2001

(54) OPTICALLY ANISOTROPIC MICRO LENS WINDOW FOR SPECIAL IMAGE EFFECTS FEATURING PERIODIC HOLES

(76) Inventor: Kenneth E. Conley, 3308 Mikelynn La., Matthews, NC (US) 28105

( * ) Notice: Subject to any disclaimer, the term of this patent is extended or adjusted under 35 U.S.C. 154(b) by 0 days.

(21) Appl. No.: 09/615,500

(22) Filed: Jul. 13, 2000

(51) Int. Cl.⁷ .................. G02B 27/10; G03B 21/60
(52) U.S. Cl. ................ 359/619; 359/620; 359/454
(58) Field of Search ........................ 359/619, 620, 359/622, 623, 454, 455, 459

(56) References Cited

U.S. PATENT DOCUMENTS

| | | | |
|---|---|---|---|
| 4,414,316 | 11/1983 | Conley | 430/496 |
| 4,420,502 | 12/1983 | Conley | 427/54.1 |
| 4,420,527 | 12/1983 | Conley | 428/172 |
| 4,541,727 | 9/1985 | Rosenthal | 365/232 |
| 5,362,351 | 11/1994 | Karszes | 156/243 |
| 5,642,226 | 6/1997 | Rosenthal | 359/619 |
| 5,644,431 | 7/1997 | Magee | 359/619 |
| 5,926,319 | * 7/1999 | Philips et al. | 359/620 |
| 6,144,496 | * 11/2000 | Goto | 359/619 |
| 6,226,907 | * 5/2001 | Conley et al. | 40/454 |
| 6,237,264 | * 5/2001 | Gulick, Jr. | 40/454 |
| 6,256,150 | * 3/2001 | Rosenthal | 359/619 |

* cited by examiner

Primary Examiner—Georgia Epps
Assistant Examiner—Saeed H Seyrafi
(74) Attorney, Agent, or Firm—Dougherty & Clements LLP

(57) ABSTRACT

An optical device that modifies a conventional anisotropic lens array to enable the viewer to perceive a repertoire of preselected images over a first range of angles of regard or to see through the device to a scene beyond the device without distortion. The preselected images in one orientation gives the illusion of a repertoire of images at differing depths. The preselected images at a second orientation can produce a set of optical effects wherein one image gradually transforms to another, or the repertoire of images are unrelated and change suddenly one to another or the repertoire of images are frames of a motion scene or finally, the repertoire of images represent a scene at differing magnifications. The optical device provides distortion-free windowing and a reasonably rich repertoire of images. The device may also be applied to applications requiring optical anisotropy such as privacy filtering.

22 Claims, 11 Drawing Sheets

OPTICALLY ANISOTROPIC MICRO LENS WINDOW FOR SPECIAL IMAGE EFFECTS FEATURING PERIODIC HOLES

FIELD OF THE INVENTION

The present invention relates to optical devices wherein an image seen by a viewer depends on the viewer's angle of regard with respect to the plane of a windowpane-shaped device. More particularly, the invention relates to a lenticular sheet with periodic optical elements formed such that the viewer perceives a series of images which change depending on the viewer' angle of regard of the windowpane-shaped device.

BACKGROUND OF THE INVENTION

Existing optical systems can present a sequence of two or more images which appear as the viewer changes their angle of regard over a range of less than 90°, typically about 45°. The viewer's angle of regard is the angle between a normal to a plane and a viewer's eye. These systems use a device consisting of a regular array of piano-convex cylindrical lens elements with a periodicity that depends on a viewing distance for which the device is designed. For example, at normal viewing distances for reading of 18 inches, the periodicity of the cylindrical elements is preferably 100 elements to the inch or more. Optical system designs of up to 250 elements per inch can be achieved using such systems. Each lens element brings a slice of an underlying printed image into focus. The underlying printed image is composed by a computer program from a desired image sequence, the optics used and viewing geometry. Without the array of lenses, the printed image appears to be a set of stripes that run orthogonally to the axes of the lenses with a multi-image stripe periodicity equal to the lens periodicity but divided into image-specific stripes by the number of images in the set. For example, if the set has eight images and the lenses are at 100 per inch, a periodicity of eight stripes in 0.01 inches are used, one stripe for each image. The viewer sees the intersection of a focused stripe due to the lens and the printed stripe. Technically, two configurations exist, one in which the cylindrical axes are vertical, and one in which the axes are horizontal. In the vertical case, the images are selected to appear at differing depths since the right and left eyes of the viewer have differing angles of regard. The device can be stationary, and, typically, eight images that appear to be at differing depths are superimposed. In the horizontal case, the viewer's angle of regard must be changed. As the device is rotated through a series of angles of regard, a sequence of images is seen. Various effects are possible depending on the design of the stripes. One image can gradually transform into another, termed "morphing". A sequence of images of various stages of an action scene can give a motion-like effect, termed "motion". If the images are unrelated, the viewer will see the unrelated sequence appear, termed "flip". One image can be a magnification of the preceding image and the effect is similar to looking through a zoom lens, termed "zoom".

Existing lens arrays are fabricated by first designing a cutting tool with a desired lens shape, then using this tool to cut the shape of an array of flat lenses into a flat plate or cylinder. This pattern is then transferred to a plastic sheet using conventional methods. The striped image array can be produced by a thermal or piezoelectric ink jet printer that is readily capable of producing 1200 picture elements per inch and laminated to the flat side of the array. When the thickness of the lens array sheet is small enough, the pattern can be reverse printed using a printing press. Reverse printing using a transfer printing press is an option for array resolutions of greater than 60 elements per inch. Another option for directly printing a reverse image on the array is screen printing which is an option for array resolutions of greater than 10 elements per inch up to about 60 elements per inch. The lamination technique is broadly applicable. The printing medium may be plastic or paper. Since the printed array has the same frequency as the lens array, the print that contains the multiple image information must be linearly registered to the lens. The device operation is designed into the image dissection and the lens array. The lens array is typically fabricated from a plastic. Many different materials can be used, for example acrylics, polystyrenes, polycarbonates, polyesters or equivalent materials. The thickness of the finished sheet is related to the periodicity of the lens elements, which effects the lens cross section. The thickness of the array depends on the index of refraction of the plastic material.

$$T \propto \frac{Dn}{2(n-1)} \qquad [1]$$

where:

T is the thickness of the sheet,

D is the width of a lens element (in consistent units with T), n is the index of refraction of the material.

The above formula assumes that the lens cross section is substantially circular. Other cross sections have been proposed. For example, U.S. Pat. No. 5,642,226 suggests a parabolic cross-section. The proportionality relation still holds for the parabolic cross-section, but the constant that must be introduced to make the equation an equality is different.

The criteria for a satisfactory lens design include the ability for the lens to sharply focus on the image plane. In order to provide an unequivocal differentiation from one selection to the next, the uncertainty of the focus at each selected angle of the array must be small enough. For a sequence of eight images, the uncertainty should be about 6% of the width of the lens or less. The range of foci along the dimension orthogonal to the lens axis determines the range of angles available for the image effects. At an angle of regard larger than about 30°, each lens focuses on a slice that is under the orthogonal projection of the next lens element on the image plane. However, the selection quality can nonetheless be judged over the ±30° range. Within the range of angles used in the design, the foci should stay within such orthogonal projection. The range of useful angles is established using the angle at which the foci cross a line that represents the edge of the projection. For example, in existing designs using acrylic lens material, the line is typically crossed at about 30°, yielding a better than 45° viewing range for images. Each image becomes stable with a rotation of about 6°. If the range were very small, the viewer would be challenged to maintain the orientation over an angle much less than 6° or the design would be required to reduce the repertoire of images to fewer than eight. It can be useful to think of this in reverse. That is, determine the angles of regard that correspond to desired selection points. The viewer can easily and unnoticeably vary an angle of regard by a few degrees. Consequently, the set of angles of regard are not required to form a linear series.

Two cross sections have been used in industry, circular and parabolic. The circular cross section has only a single parameter, the radius, which is typically greater than D/2. The choice of a radius determines the constant of proportionality that makes formula [1] into an equality. The reason the radius is greater than D/2 is that adjacent lenses meet at an angle that must be fabricated. Were the radius exactly D/2, the angle would be an impractical 0°. For simplicity of discussion, all dimensions are normalized by dividing by D/2.

After normalization, the viewer's eye is typically 3000 units or more away. From the point of view of an individual element, the change in angles of regard across the element can be neglected. This is not true from the point of view of the array, and the stripe design accounts for this difference. The circular cross section in these normalized units is defined by $x^2+y^2>1$. To analyze the focusing power, a normal to the surface is used to apply Snell's refraction law. The angle of the normal to the circular surface is $\arctan(y/x)$.

To apply the solutions disclosed in U.S. Pat. No. 5,642,226, a parabolic cross section is defined by the less familiar equation: $y=k(1-x^2)$, which is presented in the same normalized units. Unfortunately, U.S. Pat. No. 5,642,226 does not teach the range of the parameter k over which the preferred solution exists. The angle of the normal to the parabolic surface is arc $\tan(1/2kx)$. The refractive analyses depend on the parameter k. Mathematically, a parabola is a line that is equidistant from a point (e.g., 0, $k-k/4$) and a line ($y=k+k/4$) which are commonly termed as the focus and the directrix, respectively. In U.S. Pat. No. 5,642,226, k is positive definite or greater than zero. Because of practical considerations in constructing a lens array, the range of x for these normalized units is −0.8 to +0.8, which allows 10% of the skirts of the lens for molding or extrusion tolerance. Symmetry allows for considering the range of 0.0 to +0.8 for x and positive angles of incidence with respect to a normal to the array. Snell's law is applied assuming that the index of refraction of the plastic material is 1.45 which is in the range for common acrylics. Better designs could be realized with a higher index of refraction materials such as those that are used in plastic lenses for spectacles which are considered cost prohibitive. The following table presents some critical data used in the refractive analyses of the lens array in U.S. Pat. No. 5,642,226.

TABLE 1

Angle of the orthogonal for a circle and example parabolas in degrees

| x = | 0 | 0.20 | 0.40 | 0.80 |
|---|---|---|---|---|
| Circle | 90 | 78.46 | 66.42 | 36.87 |
| k = 2 | 90 | 51.34 | 32.01 | 17.35 |
| k = 1 | 90 | 68.20 | 51.34 | 32.01 |
| k = 0.5 | 90 | 78.69 | 68.20 | 51.34 |

Refractive analysis proceeds as follows: a ray makes an angle with respect to the normal to the surface of the array. From Table 1, the angle the ray makes with respect to the orthogonal is calculated. From Snell'law, the angle of the ray inside the dielectric is calculated (for example, the acrylic) with respect to the orthogonal from Table I. The result of the analysis is that for larger values of k, the thickness of the array is reduced as suggested in U.S. Pat. No. 5,642,226. However, the accuracy of focus is substantially inferior. For large values of k, all hope of presenting eight distinct images to the viewer is lost. As the parameter k is decreased, the focusing power of the lens improves dramatically. However, concomitant with that improvement, the focal plane is no longer improved. Moreover, the angular range is restricted rendering the selection angle range extremely small (much less than 45°).

The numeric results of refractory analysis of the lens array of U.S. Pat. No. 5,642,226 are provided in Table 2. Each parabola and the circular case have been analyzed with incident rays every 5°. The average value of x is reported. If x is in the range of −1 to 0, it is within the orthogonal projection of the lens on the focal plane. An x value of less than −1 signifies that the angular range has been exceeded. Referring to the data for k=2, the range available for the presentation of an image sequence is less than ±5° or a total range of less than 10°. Such a small range is unsatisfactory for presenting a reasonable sequence of images. On the basis of this criterion, k must be in the range of 0.5 to 1.0, and the available range for a parabolic cross section is less than 30°. For many applications, this value of k is satisfactory. The rows titled SD (x) are the standard deviations of the values of x taken over a range of ray intersection points. This number measures the ability of the lens to select the correct image at high contrast. An ideal solution would have a 0 standard deviation. On the basis of standard deviation, k =1 can be ruled out because x(10°)−SD (x, 10°)<x(5°)+SD(x, 5°) resulting in focus lines that significantly overlap to reduce contrast. The overall relative thickness of the array is k−opt (y) for parabolic designs and 1−opt (y) for circular designs. Unless the parabolic array is addressed through an aperture that avoids intersecting the array on the skirts of the parabola, the optimum thickness for best foci exceeded the substantially circular design point.

TABLE 2

Results of the analyses of U.S. Pat. No. 5,642,226

| Parabola | Angle | 5° | 10° | 15° | 20° | 25° |
|---|---|---|---|---|---|---|
| k = 2 | x | −1.24 | −1.55 | −1.91 | −2.31 | −2.75 |
|  | SD (x) | 0.30 | 1.62 | 1.94 | 2.31 | 2.74 |
|  | opt y | −2.31 | −2.55 | −2.78 | −2.99 | −3.15 |
| k = 1 | x | −0.64 | −0.92 | −1.23 | −1.56 | −1.91 |
|  | SD (x) | 0.62 | 0.80 | 1.01 | 1.26 | 1.54 |
|  | opt y | −2.38 | −2.59 | −2.77 | −2.91 | −3.00 |
| k = .5 | x | −0.47 | −0.81 | −1.18 | −1.55 | −1.92 |
|  | SD (x) | 0.30 | 0.44 | 0.61 | 0.81 | 1.03 |
|  | opt y | −3.66 | −3.89 | −4.06 | −4.15 | −4.17 |
| k = .4 | x | −0.48 | −0.86 | −1.27 | −1.68 | −2.08 |
|  | SD (x) | 0.25 | 0.39 | 0.55 | 0.75 | 0.96 |
|  | opt y | −4.43 | −4.67 | −4.84 | −4.91 | −4.90 |
| Circle | x | −0.08 | −0.27 | −0.46 | −0.65 | −0.83 |
|  | opt y | −1.75 | −1.82 | −1.85 | −1.85 | −1.80 |
|  | SD (x) | 0.13 | 0.14 | 0.14 | 0.13 | 0.11 |

U.S. Pat. No. 5,642,226 offers another solution wherein the transparency is achieved by introducing a parallel concave lens array in the back surface of the primary array. The concave lens is constructed to have a negative focal point equal to the positive focal point of the front-surface lens. This combination allows an image behind the array to be viewed by the observer. In optics, a concave-convex lens is referred to as a meniscus lens. Such a lens can be positive or negative depending on the focal points of the convex and concave surfaces. The normal assumption is that the lens is thin. That is, the thickness of the lens is much less than either focal length.

In U.S. Pat. No. 5,642,226, the requirement is that the convex lens sharply focus the incoming light rays to perform a critical selection function. As a result, the concave portion of the array perforce substantially focuses light at the intended "see through" angle before striking the concave lens. This combination does not act as a thin, zero-magnification meniscus lens. The negative lens does allow the transparency objective to be realized. However, an undistorted view of the image positioned behind the array is available only on a precisely placed plane. Three-dimensional objects are unfortunately distorted. The position of the plane bears a fixed relationship to the thickness of the primary array. If the primary array is on the order of 0.015 inches, thick, the rear image must be less than 0.1 inches from the rear of the primary array for best foci.

U.S. Pat. No. 5,642,226 further suggests that a lens system can be realized using diffraction rather than refraction for the objective of an anisotropic lens array that acts as a window over a set of angles of regard and produces a second image or sequence of images over another set of angles of regard. The fundamental principle is that a transparent object when illuminated by a coherent light produces a spatial distribution of light amplitudes that characterize the object. If a cylindrical lens is so illuminated, the lens gives rise to a set of refracted spherical waves, one corresponding to each point of the lens. Since the illumination is coherent, each wave of the set of refracted spherical waves is mutually coherent and produces an interference or diffraction pattern determined by the relative refraction of every point in the lens. The pattern is characteristic of the lens. Generally, the pattern is captured in a photosensitive emulsion. Since photosensitive emulsions are sensitive to light intensity and not the amplitude variations produced by the diffraction pattern, the emulsion is illuminated with a reference beam that is coherent with the beam that illuminates the lens in addition to the light that characterizes the object. This is referred to as a phase-reference hologram and represents the most effective way to realize such a lens. Diffraction-based lenses such as the one described in U.S. Pat. No. 5,642,226 and earlier devices such as Fresnel zone-plate lenses are rarely seen in optical devices for managing incoherent white light since the quality of performance of the diffraction pattern depends strongly on the wavelength of light.

U.S. Pat. No. 5,642,226 further suggests that a lens system can be realized using the Fresnel lens technique when designing lenses for the objective of an anisotropic lens array that acts as a window over a set of angles of regard and produces a second image or sequence of images over another set of angles of regard. The imaging of lenses depends primarily on the surface curvatures of the surfaces of the dielectric rather than the thickness of the dielectric material. The focusing effect of a normal lens can be obtained in an optical element if the surfaces are divided into small elements and these elements are brought together in a common plane that is normal to the optical axis. This is referred to as the Fresnel lens technique. Such lenses are termed "Fresnel lenses". Unfortunately, breaking up the aperture of a lens into small zones destroys the continuity of the wave front. Therefore, such lenses do not provide high performance or clarity of image. The technique is useful where high performance is not necessary and/or where the thickness of the lens is paramount.

A high zone count Fresnel lens and a Fresnel lens that features the actual surface shape of the lens being simulated as opposed to the more easily fabricated linear approximation will be required to apply the Fresnel lens technique to situations where the image repertoire is in the typical range of eight. For directly viewed anisotropic lens arrays where the viewing distance is approximately 18 inches, the preferred lens width is 0.01 inches or less. For a circular cross section lens for this viewing distance, the overall thickness is approximately 0.015 inches. The maximum thickness saving using the Fresnel lens technique is less than 0.05 inches. The saving approaches 0.05 inches as a limit as the number of zones increases. As the number of zones increases, the precision of the die from which such arrays are fabricated perforce increases as does the fabrication cost. For ten zones, the die precision increases at least threefold. To effectively select from a repertoire of eight images, each image's angular range should be sampled by at least two, preferably three zones. This implies that at least sixteen, preferably more zones are required even further exacerbating die complexity and molding costs. Solutions based on the Fresnel technique are best applied to a long viewing distance array with limited image repertoires. For example, for a 300-foot viewing distance, the preferred lens width is 2 inches and the array thickness is approximately 3 inches. Saving 30% of the material given, a 300-foot design point may justify the Fresnel technique. In such billboard applications, a lens' array can be assembled in situ by abutting array segments that are several feet wide and tens of feet long. Unfortunately, for most applications, the Fresnel technique is contraindicated.

U.S. Pat. No. 5,642,226 further suggests using a transparent dielectric, such as acrylic, with the viewer side printed with opaque stripes and the far side printed material sampled by stripes of the pitch, aligned with the viewer side stripes. Over one range of angles of regard, the viewer observes the clear portion of the back of the device interstitial to the opaque front side stripes. Over another range of angle of regard, the viewer observes the printed image on the back side of the device interstitial to the opaque front side stripes. This simple device is suitable in the situation where there is a desire to see a single image or a window depending on the angle of regard. Provided the spacing of the opaque stripes are small compared to the viewing distance (1:1000 or better) and the thickness and index of refraction of the plastic sheet are appropriately chosen so that the refraction limited angular range is not a concern. Unfortunately, this device cannot encompass a sequence of images that appear as the angle of regard changes.

U.S. Pat. No. 4,541,727 introduces voids into an image affixed to the backside of a standard lens array. The array can permit the viewer to see a first predetermined image printed on the backside of the array or, over another range of angles of regard, see an object behind the array. If the image behind the array were a watch (the example used in U.S. Pat. No. 4,541,727), at several times of the day the hands of the clock are positioned at right angles, for example, 3 o'clock. One hand aligns with the axes of the cylindrical lenses of the array and becomes visible. The other hand, being at a right angle with the first hand, is aligned at a right angle with respect to the array. This hand is out of focus since the foci are perforce on the backside of the array. Further, this hand is optically segmented by the array of lenses. Experimentally, this hand is so distorted in view as to disappear entirely.

U.S. Pat. No. 5,644,431 discloses a first structure that is substantially similar to one of the structures in U.S. Pat. No. 5,642,226 and previously discussed hereinabove. U.S. Pat. No. 5,644,431 acknowledges the distortion of see-through image and designs a focal length of a negative lens to assure that the emerging rays are substantially parallel. This solves the problem found in U.S. Pat. No. 5,642,226 of the requirement for a precise and generally very small distance of the see-through image from the back of the array. The assertion is that the distortion is tolerable since the distortion amounts to graininess in one dimension of the object behind the array. The array will demagnify the see-through image in one dimension but not the other. U.S. Pat. No. 5,644,431 also discloses an array of spherical micro lenses. The back side of the array contains an array of spherical micro lenses in one to one correspondence with the front side. The lenses on both sides of the array are positive or convex. U.S. Pat. No. 5,644,431 suggests that two plano-convex array sheets should be fabricated and then aligned and bonded together to form the final array. The back side is no longer suitable for imprinting images due to the back side lenses. Further, achieving see-through with the array disclosed by U.S. Pat. No. 5, 644,431 is undermined because the back side is out of focus with respect to the front side lenses.

What is therefore needed is a high performance lenticular system that provides an image sequence as a viewer's angle of regard changes. Further needed is a lenticular system having a display of a repertoire of two or more images from a viewer side while simultaneously permitting viewing through the display at a pre-determined angle of regard. Further needed is a lenticular system that may be manufactured using non-complex dies and inexpensively molded and that provides an image sequence using a micro lens array wherein a printed image may be laminated or otherwise affixed to a back side of the array.

SUMMARY OF THE INVENTION

The invention is a lenticular system having a periodic array of miniature lens-structures that are formed in a transparent material. The array of lens structures may take the form of a sheet, panel or otherwise substantially flat material. In one embodiment, the array consists of long cylindrical plano-convex lenses, or lens elements, arranged in a one-dimensional pattern. The convex portion of each lens has a substantially circular cross section. The surface of the convex portion is incomplete and preferably includes a distributed periodic array of holes that pierce the plano-convex lenses perpendicular to the plane of the axes of the lenses. The holes have a substantially circular cross section and a diameter that is less than the distance between adjacent lens axes, the reciprocal of the lens periodicity. This embodiment can present a sequence of two or more (preferably eight) images which appear as the viewer changes an angle of regard over a range of less than about 60° and preferably less than about 45°. The periodicity of the micro lens elements depends on the viewing distance for which the device is designed. For example, at normal viewing distances for reading of about 18 inches, the concentration of plano-convex lenses is preferably 100 elements to the inch or more.

Each lens element brings a slice of the underlying printed image into focus. At viewing angles of regard that are approximately aligned with the holes, the array is transparent and brings a sufficiently illuminated scene behind the device into view. The underlying printed image is preferably composed by a computer program based on a desired image sequence and predetermined optics and viewing geometry. Without the array of lenses, the underlining image appears to be a set of stripes that run orthogonally to the axes of the lenses with a stripe periodicity equal to the lens periodicity but divided into image specific stripes by a predetermined number of images with the exception of the hole areas. For example, if eight images are desired and the lenses were at 100 per inch, there would be eight stripes in 0.01 inches, one of the eight stripes corresponding to each image. The viewer sees the intersection of the focused stripe due to the lens and the printed stripe unless viewing the array at an approximate see-through angle of regard. If the holes pierce the array at an angle, the see-through angle of regard is not normal to the surface of the array.

In one embodiment, the holes incompletely pierce the array. For example, the array may have a planar side and a lens side opposing the planar side. In this example, the holes may rise from the planar side to almost pierce the array but stop short of penetrating the lens side. Alternatively, the holes may pierce the array of lenses but not completely pierce the planar side.

In another embodiment, the holes may be filled with a dielectric material having a higher index of refraction than the array. In this embodiment, each hole acts as a light guide, and the image repertoire contrast is enhanced.

OBJECTS OF THE INVENTION

The principal object of the invention is to provide an advertising medium for use in retail store windows with optical properties that draw the attention of customers by offering a display of a repertoire of two or more images from a viewer-side without losing outside awareness through the window regardless of whether the viewer-side faces inward or outward.

Another object of the invention is to provide an array of lenses that presents a repertoire of images differently to the right and left eye of the viewer to yield a perception of depth, or to present standard optical effects of morph, motion, flip or zoom while maintaining viewability through the array.

A more particular object of the invention is to provide an array of lenses that acts as a one-way window wherein viewers on a lenticular side of the window can view beyond the window while viewers on a backside of the array cannot see through the array.

Another object of the invention is to provide an array of lenses having optical anisotropy for purposes such as antiglare screens for computer monitors including flat panel monitors, viewing security for computer monitors including ATM monitors, antiglare dashboard displays, antiglare cockpit displays and any other application of a display where control of ambient illumination is difficult.

BRIEF DESCRIPTION OF THE DRAWINGS

The foregoing and other objects will become more readily apparent by referring to the following detailed description and the appended drawings in which.

DETAILED DESCRIPTION

Figure 1:
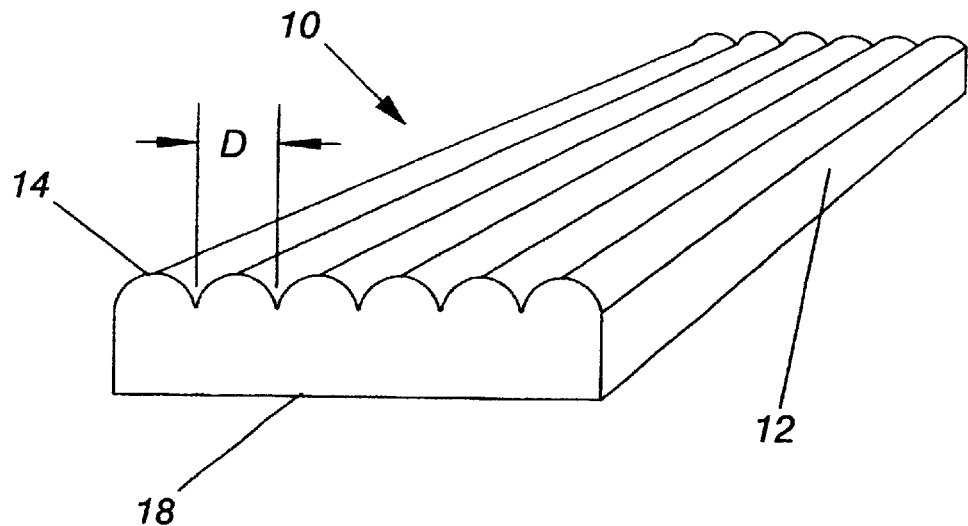
FIG. 1 is a perspective view of a portion of a known lenticular array.

Referring to the drawings, FIG. 1 is a perspective view of a portion of a known lenticular array 10. The array 10 has lens elements 14 that are cylindrical lenses with a circular cross section. The width of each lens is D. The lenticular array consists of a dielectric medium 12 with multiple convex lenses 14 formed on a viewer side. The dielectric medium may be any transparent material, but is typically a clear plastic having good mechanical properties. The planar side of the array 18 contains a printed image that is commonly designed by a computer to be addressed by the array 10 and variation in a viewer's angle of regard.

Figure 2:
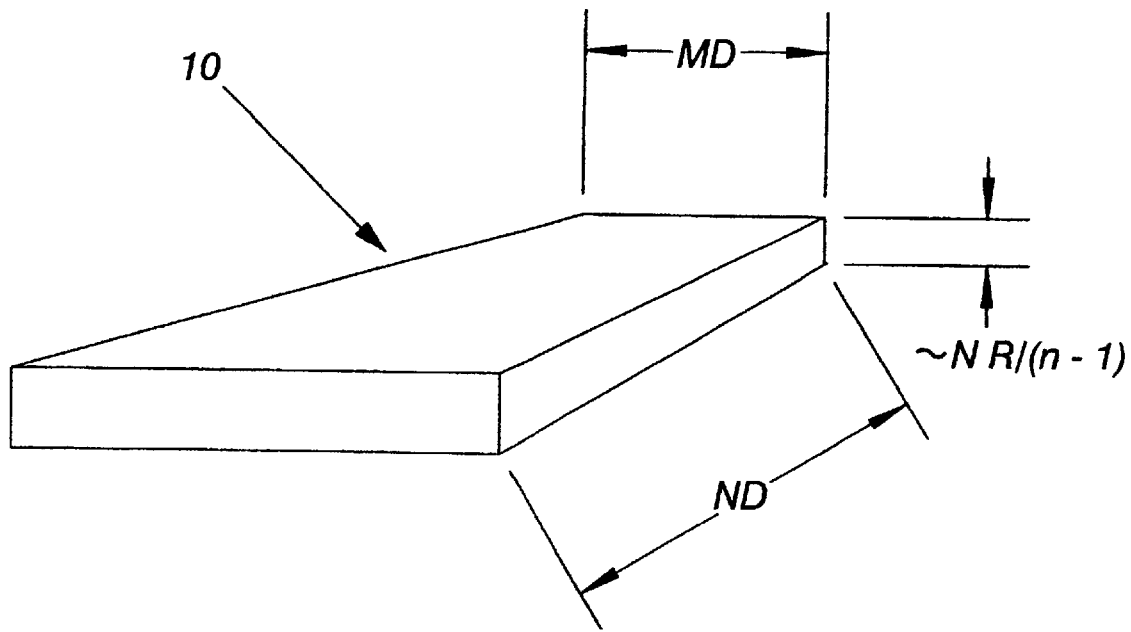
FIG. 2 is a perspective view of a known lenticular array.
Figure 3:
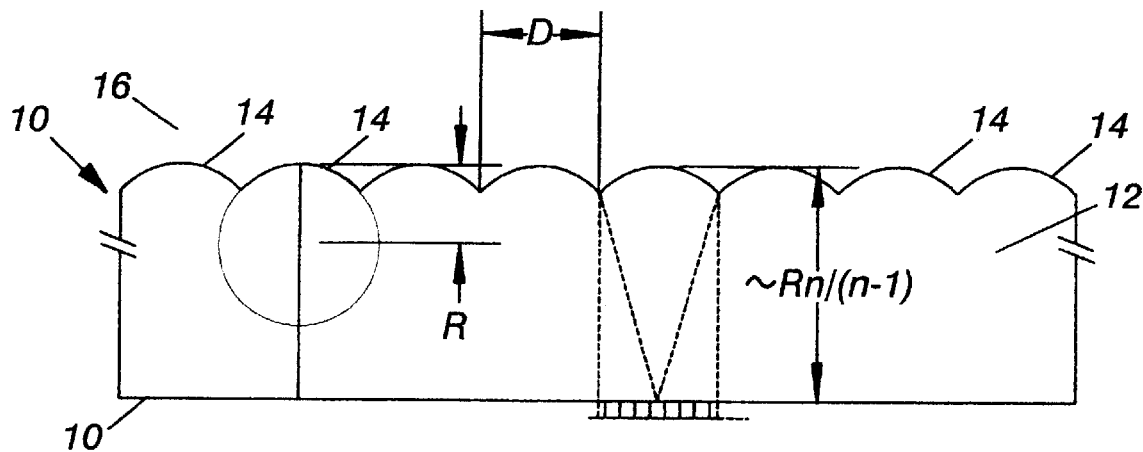
FIG. 3 is a cross-sectional view of the lenticular array shown in FIG. 1.

FIG. 2 is a perspective view of the complete lenticular array 10 of which a portion is shown in FIG. 1. FIG. 3 is a cross-sectional view of the lenticular array 10 shown in FIG. 1. The array 10 comprises a sheet of material with dimensions MD×ND×~nR/(n−1) where D is the width of a lens element 14 as best shown in FIG. 3, n is the index of refraction of the plastic material, R is the radius of the lens element 14 and $R \geq D/2$. M and N are product variables. In one example where a button that flips from a picture of a general to the slogan "I like Ike", M and N may be on the order of 50 to 100. For an 8 ½×11 inch page, M and N may be on the order of 850×1100 or more. The actual dimension D depends on the design viewing distance and quality objectives.

The transparent material is commonly formed as a sheet with a lens array formed on a front side 16, or a viewer side. The back side 18, or flat side, is considered a non-viewer side. The radius of the substantially circular cross section, R, is shown larger than the lens spacing D. The overall thickness of the array is:

$$\text{Thickness} \approx \frac{R \times n}{(n-1)} \quad [2]$$

where n is an index of refraction for the dielectric medium. The backside 18 is printed with an appropriate computer-generated image that is aligned with the lens array 10 thereby enabling the viewer to see a repertoire of two or more, typically eight, images depending on the veiwer's angle of regard.

Figure 4:
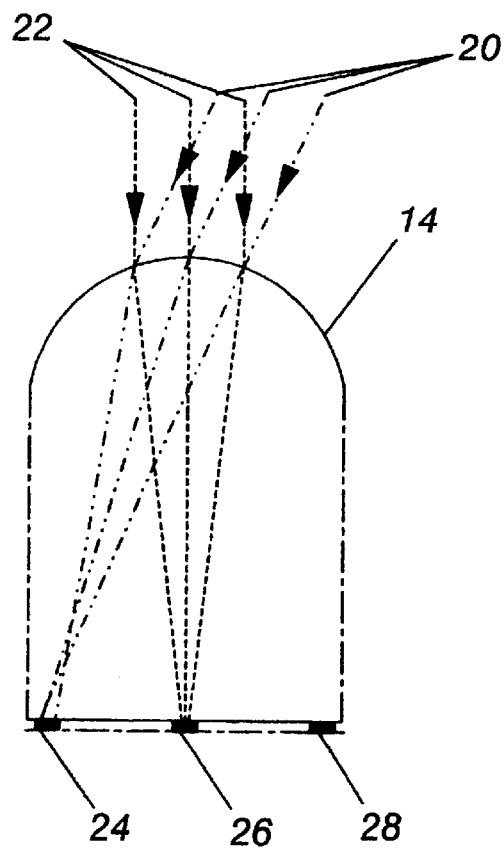
FIG. 4 is a cross-sectional view of a lens element of the lenticular array shown in FIG. 1.

FIG. 4 is a cross-sectional view of the lens element 14 of the lenticular array 10 shown in FIG. 1. Since the viewer's eye is on the order of 4,000 times the radius of the lens cross section, an individual lens can be analyzed with negligible error by assuming that light rays at a first angle 20 and light rays at a second angle 22 are parallel. The lens 14 focuses the rays from a repertoire of angles onto a repertoire of printed regions. The light rays from the first angle 20 focus on a printed region 24. From symmetry, light rays at an angle that is negative with respect to a perpendicular to the array 10, if the angle 20 is defined as positive, focus on an area 28 that is mirrored from the center line of the lens 14. Light rays from the second angle 22 focus on and therefore select a second, independent area 26. If the repertoire of images has a defined number, the lens 14 must be capable of adequately focusing on a similar number of independent areas. The actual repertoire of angles need not be a linear progression. By marking off a projection of the lens 14 on the surface 18 in q centers, where q is the number of images in the repertoire, and then calculating the corresponding angles of regard, parallel rays at those angles must focus in a reasonably non-overlapping fashion on the surface at the best image plane compromise that is available. Non-compensated lenses typically depart from the ideal. A measure of the quality of a lens is the standard deviation of a point from a spread of points that intersect the lens. If the standard deviation is such that focus areas overrun, or overlap, adjacent focus areas, the images seen are not well-defined in color and especially definition.

Figure 5:
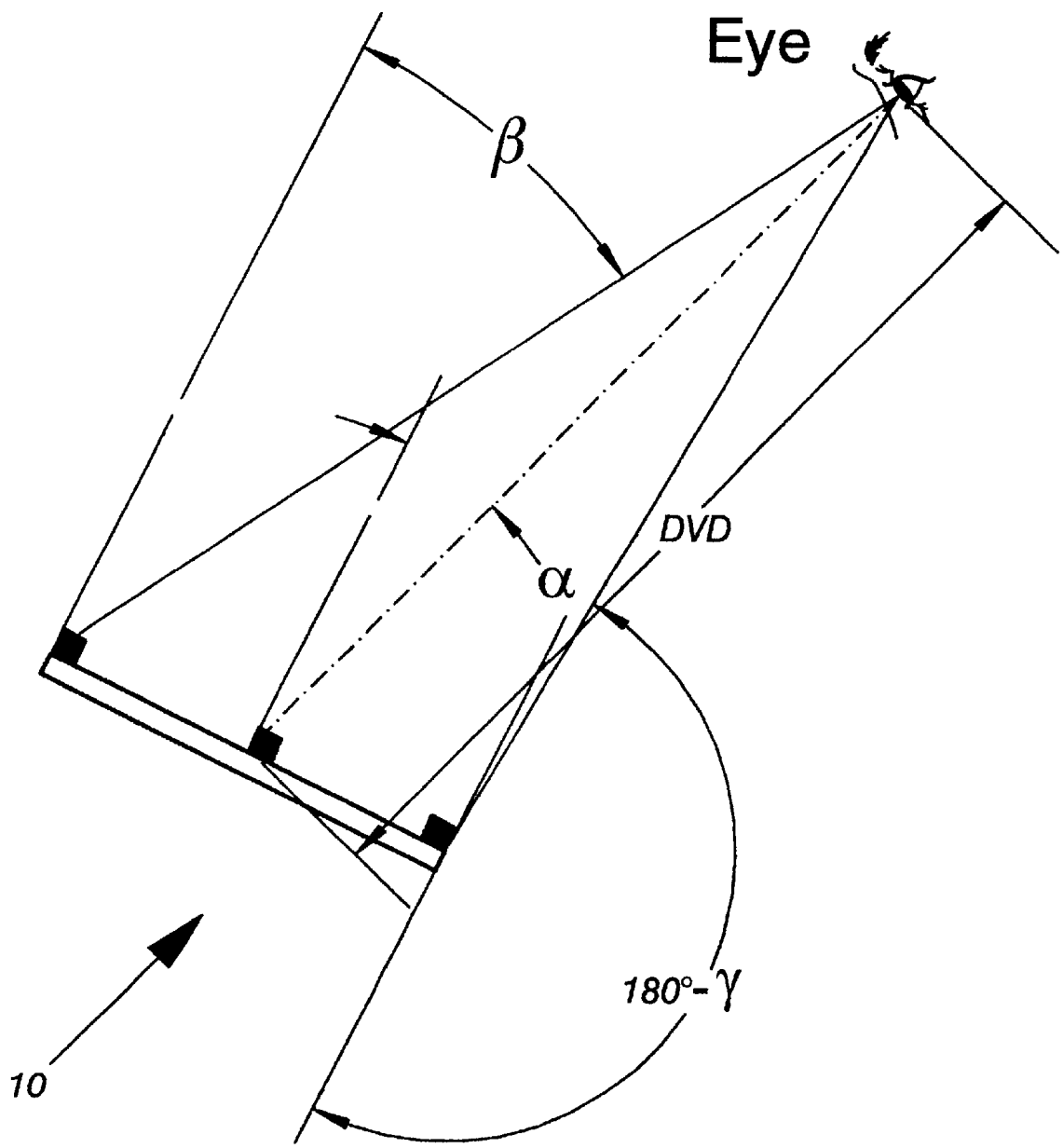
FIG. 5 is a side view of the lenticular array shown in FIG. 4 showing the geometry of the array.

FIG. 5 is a side view of the lenticular array 10 shown in FIG. 1 showing the geometry of the array. The distance from the eye of the viewer to the center of the array 10 is termed a "design viewing distance" (DVD). The lens spacing in the array 10 should be small with respect to DVD. Improvement in quality is noticeable up to a DVD/D ratio of 3400 that corresponds to 1 arc minute at the eye. Typical DVD/D ratios exceed 1000. For example, a common design point is DVD=18 inches and D=0.01 inches to provide a ratio of 1800. As previously mentioned, from the aspect of a single lens, the angle of regard with respect to a perpendicular to the lens 14 may be regarded as a constant. From the aspect of the entire array 10, this angle varies continuously and critically from an angle $\gamma$ on a bottom of the array 10 to an angle a at a center of the array 10 to an angle $\beta$ on a top of the array 10. A computer-designed printed array uses these angular variations to design underlying picture segments associated with each central angle of regard, $\alpha$. For example, eight principal angles of regard $\alpha$ corresponding to eight images may be used in a design. At each angle of regard, the gradual variation from $\gamma$ at the bottom to $\beta$ at the top are correlated with the desired image at that angle.

Figure 6:
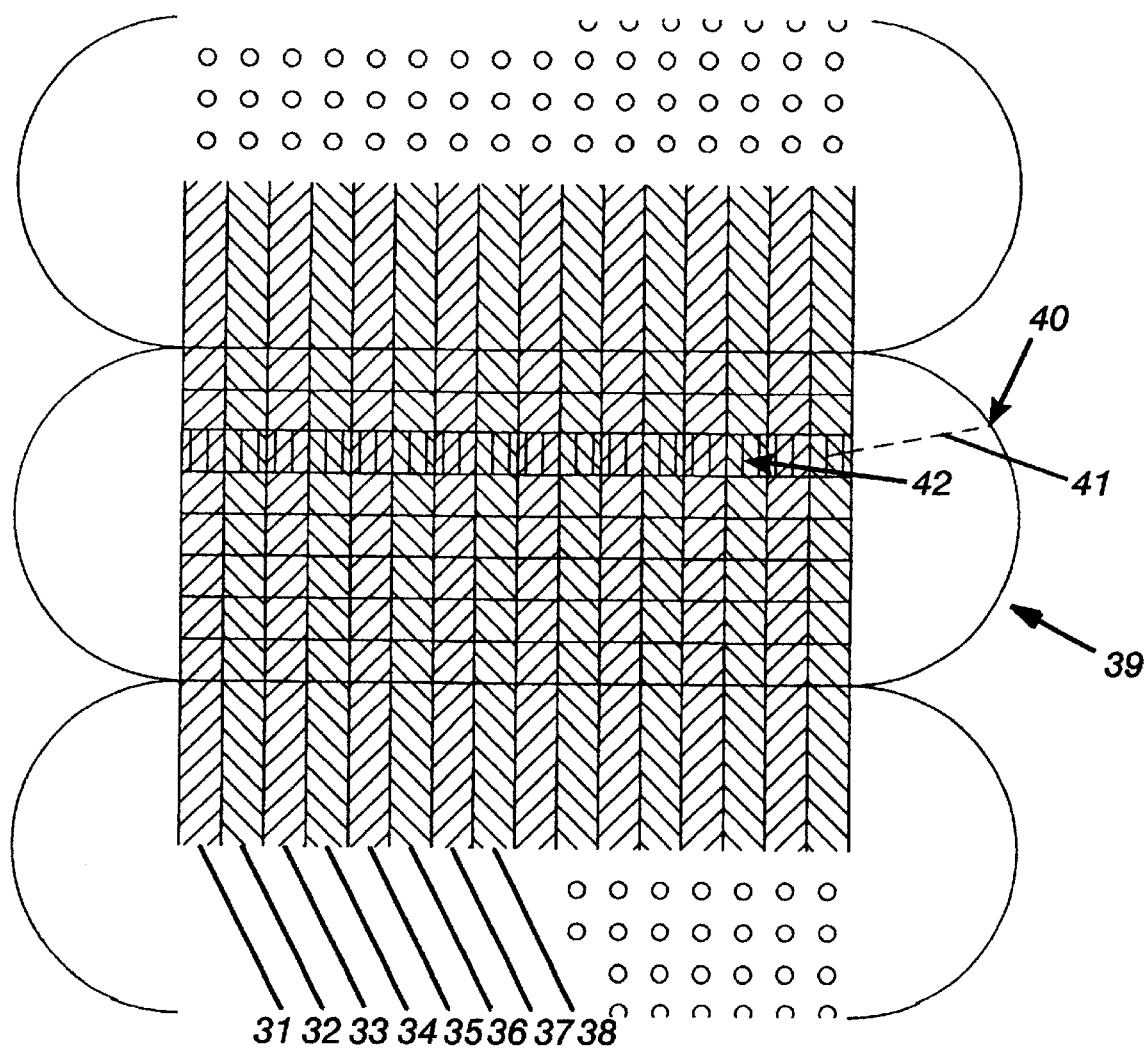
FIG. 6 is a detailed view of a known lenticular array showing image addressing.

FIG. 6 is a detailed view of a known lenticular array showing image addressing. As the angle of regard for a specific image varies from $\beta$ (FIG. 5) at the top of the screen to $\gamma$ (FIG. 5) at the bottom, the image printed in the stripes 31, 32, 33, 34, 35, 36, 37, 38 that run perpendicular to the axes of the cylindrical micro lenses vary in content. For example, for a particular micro lens, shown generally at 39, the angle of regard intersects the surface of the lens at a point 40 and is focused on a stripe 42 of about 12.5% of the width of the lens that intersects the printed stripes. The stripe 42 is aligned to the array at printing. The orthogonal stripes blend and diffuse errors throughout the image as well as account for gradual shift in angles of regard from top to bottom at each selection angle.

Figure 7:
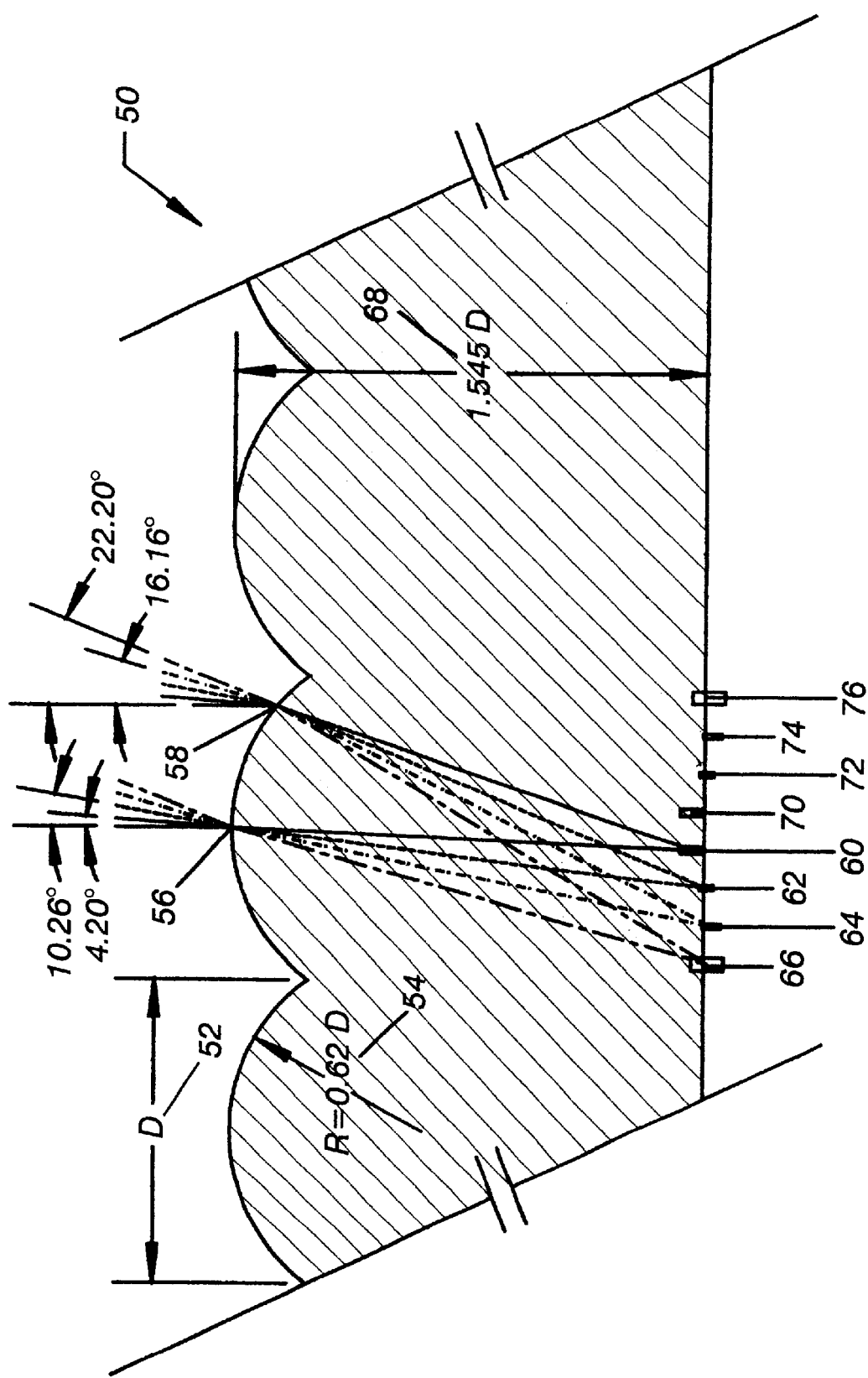
FIG. 7 is a cross-sectional view of a known lens element showing the addressing capability.

FIG. 7 is a cross-sectional view of a known lens element showing addressing capability. FIG. 7 illustrates substantially circular cross section lenses shown generally at 50. The space between lenses and/or the width 52 of a cylindrical lens 52 is D. The radius 54 of the substantially circular lens 50 is 0.62 D. The lens 50 produces good selectivity over a range of 44.4°. Since the lens is symmetrical, only clockwise angles with respect to the normal to the array are illustrated. The lens spacing is small with respect to the viewing distance, so all rays are assumed parallel for an individual lens. The bundle of rays 56, 58 were selected by reverse calculating the repertoire points 60, 62, 64 and 66. A box at the location of each repertoire point contains the focal points of a majority of the rays without regard to where such rays strike the dielectric surface. The height of the box represents a vertical uncertainty, and the width represents a horizontal uncertainty. The thickness 68 of the array, 1.545 D, is the best compromise for the entire repertoire set. Since the index of refraction used is 1.45, the thickness is somewhat less than the predicted value because a ray of average length is not a vertical ray. The similar counterclockwise angles (−4.20°,−10.26°,−16.16° and −22.20°) will, by symmetry address repertoire points 70, 72, 74 and 76 respectively.

Figure 8:
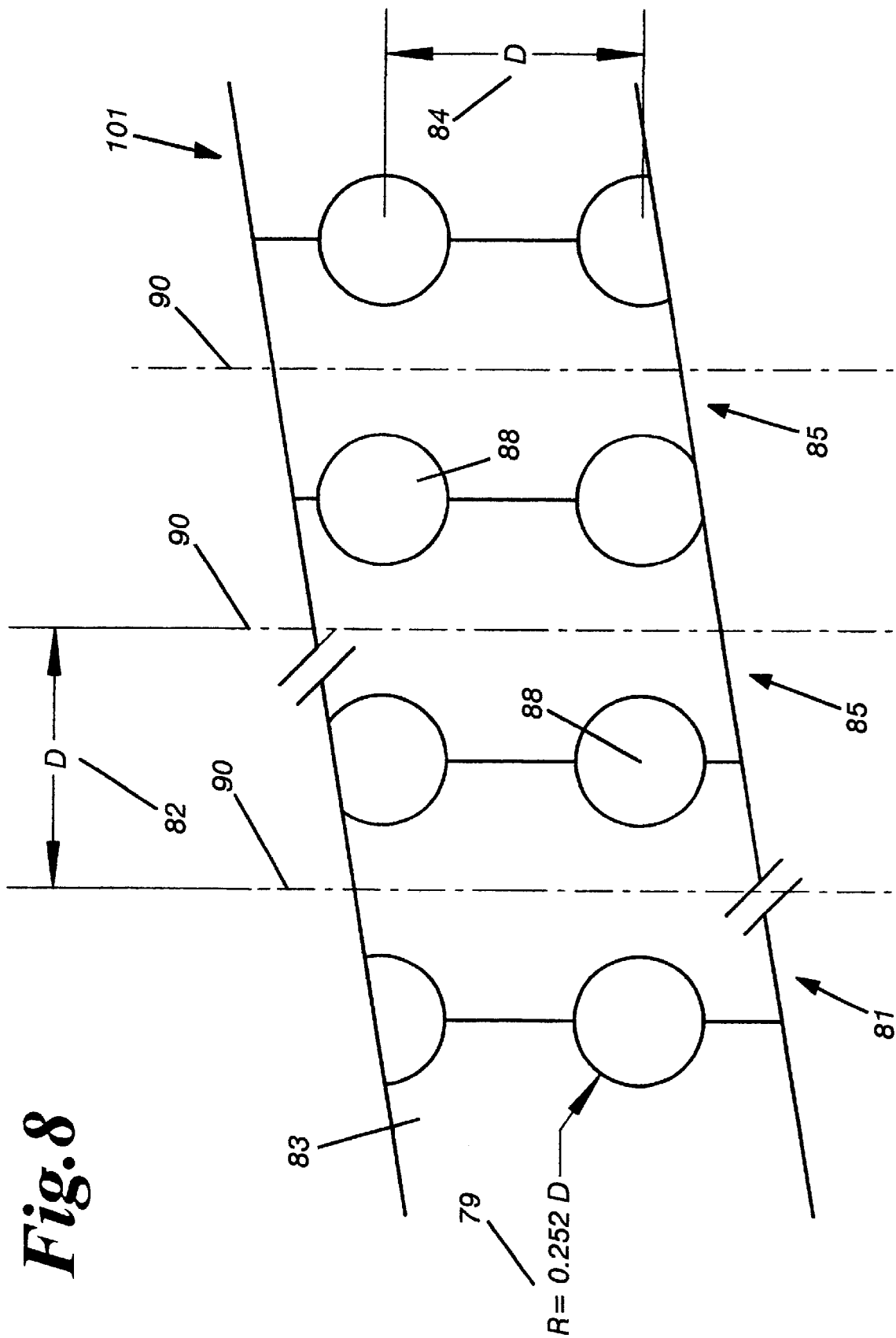
FIG. 8 is a top view of a portion of a lens array with holes according to this invention.

FIG. 8 is a top view of a portion of a lens array, shown generally at 81, with holes 88 according to this invention. In a most basic form, the invented lens array 81 is a substantially transparent sheet having anisotropic optical properties that includes a body of transparent material 83 having a pair of opposing sides, shown generally at 101, 103, and a plurality of plano-convex lenses, shown generally at 85, formed on one side of the pair of opposing sides 101, 103 and substantially covering that side. Each of the plurality of plano-convex lenses has a substantially circular cross section and pre-determined dimensions based on a pre-determined distance between the transparent sheet and a viewer. The body 83 preferably has an index of refraction substantially greater than one. Each of the plurality of plano-convex lenses 85 has an elongate arcuate segment 86 (FIGS. 9, 10, 11 and 12) and a plurality of holes 88 piercing at least a portion of the arcuate segment 86 and evenly spaced along the length of the arcuate segment 86. Each of the holes 88 preferably has at least one dimension smaller than the distance between the axes of an adjacent pair of plano-convex lenses 85. Additionally, each of the holes 88 is substantially orthogonal to the sides 101, 103 of the body of transparent material 83.

In one embodiment, as shown in FIG. 8, the periodicity of holes 88 is substantially equal to the lens periodicity D. For example, the lens periodicity may be based on the distance D, 82, between peaks of the arcuate segments 86 of each plano-convex lens 85, and may be based on the distance D, 84, between each hole 88 along an arcuate segment. In this embodiment, the relative transmission of the window, T, is related to the radius of the hole 88 as follows:

$$T = \frac{\pi}{k^2}$$

where:
T is the relative transmission,
k is given $$k = D/r$$

D is the distance between lens axes,
r is the radius of the hole.
Based on the previously mentioned relationships, the following synthesis equation is more useful:

$$r = \sqrt{\frac{T \times D^2}{\pi}}$$

Some image contrast is unavoidably lost due to the presence of the holes 88. In this embodiment, the transparency is about 0.2. This yields a hole radius 79 of about 0.252 D. The lens center lines of a fragment 90 of the lens array 81 are shown to aid orientation. The holes 88 represent 20% of the overall area of the lens array 81.

A dissection of at least one pre-determined image, such as incorporated with conventional lenticular lenses and shown in FIG. 6, may be affixed to a second side 103 of the body of transparent material 83. The dissection has interruptions formed by and aligned with the holes 88 to allow parallel light rays to pass through the sheet. The dissection is viewable by the viewer depending on the angle of regard. In one embodiment, when viewed over a first range of angles of regard, the sheet presents the viewer with a gamut of pre-determined images based on the dissection, and when viewed over a second range of angles, presents the viewer with an undistorted image of a scene on the other side of the sheet.

The body of transparent material 83 has a thickness substantially less than the width or length of the body of transparent material. The thickness of the body of transparent material 83 and the radius of each arcuate segment 86 cause parallel light rays traversing the sheet to converge on a non-viewer side 101 of the transparent sheet at a gamut of foci depending on the angles that the light rays make with respect to a normal of the transparent sheet.

Figure 9:
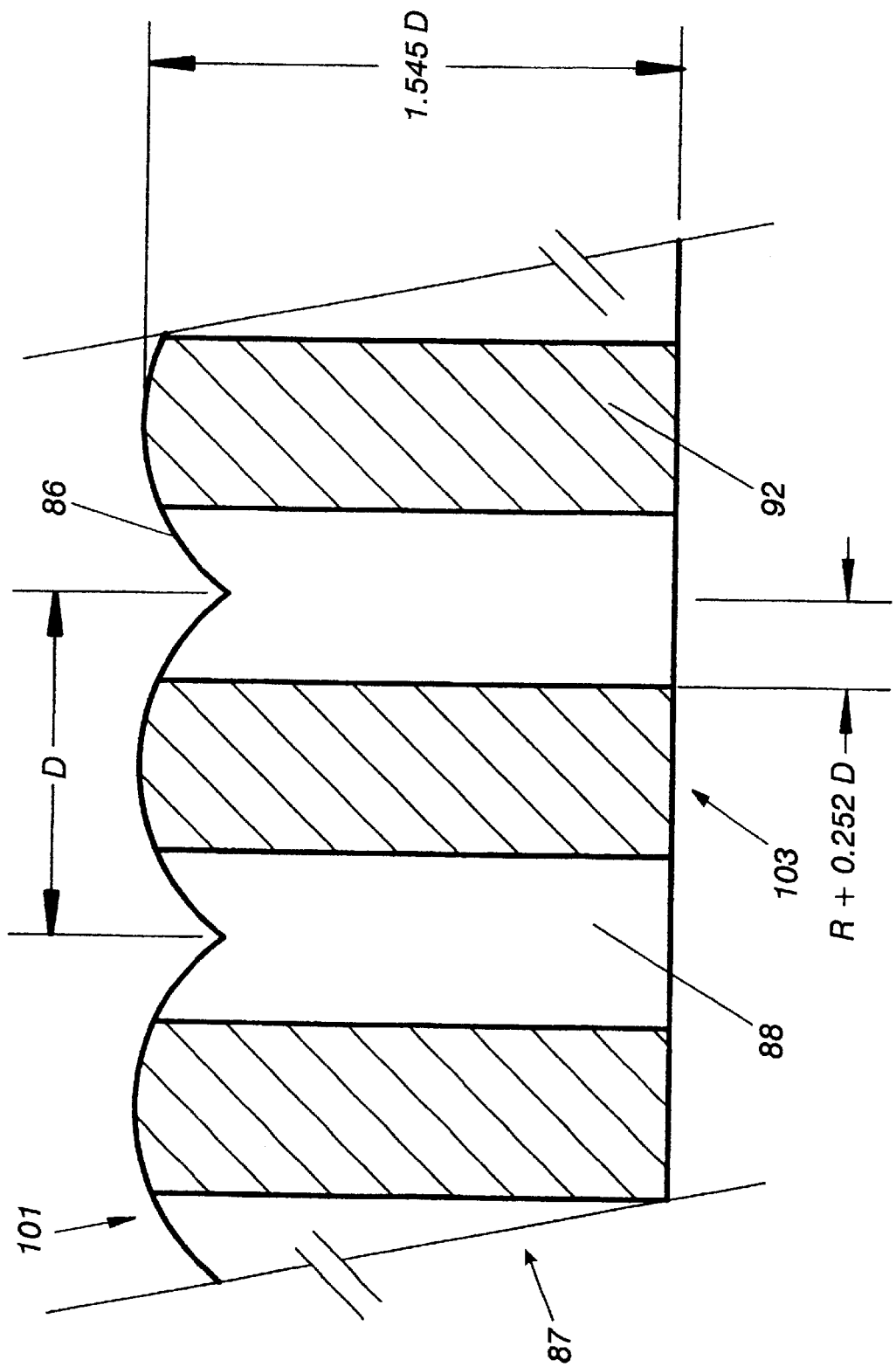
FIG. 9 is a cross sectional view of a portion of a lens array according to a first embodiment of this invention.

FIG. 9 is a cross sectional view of a portion of a lens array, shown generally at 87, according to a first embodiment of this invention. In this embodiment, the lens array 87 is shown in cross section through the center lines of the holes 88. Each of the holes 88 is filled with a dielectric material having a higher dielectric constant than the body of transparent material 83. The contrast of the images at each of said foci is enhanced by the dielectric material having the aforementioned relative dielectric constant.

Figure 10:
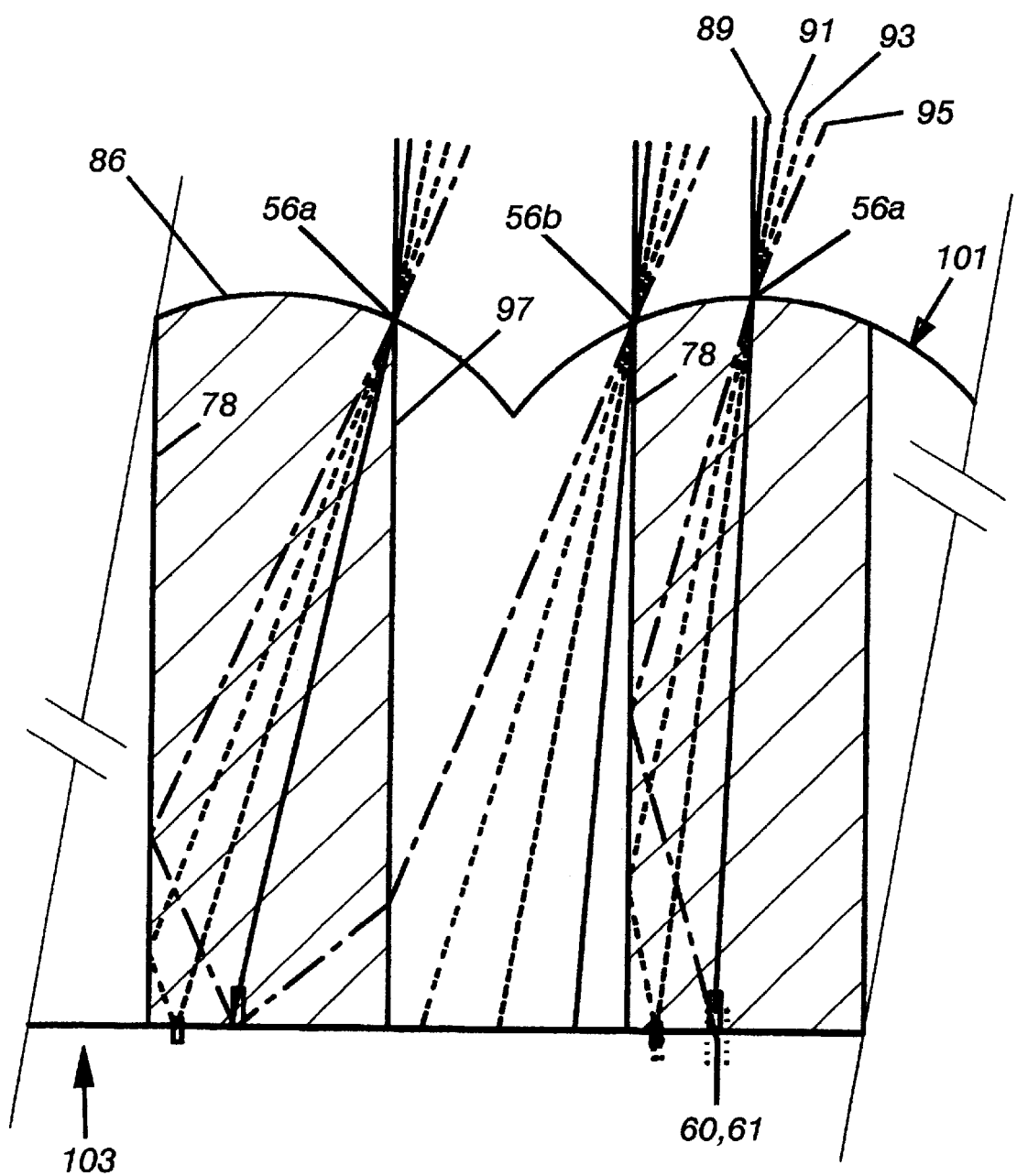
FIG. 10 is a detailed view of the lens array shown in FIG. 9 illustrating light ray paths.

FIG. 10 is a detailed view of the lens array 87 shown in FIG. 9 illustrating light ray paths 87. FIG. 10 also illustrates the effect of introducing a dielectric surface inside the array 87. Light ray bundles 56a, 56b are shown striking the lens array 87 and traveling through the array 87. We see that a 4.20° ray 89 and 10.26° ray 91 continue to find the repertoire points between the holes 88. However, a 16.16° ray 93 and a 20.20° ray 95 strike a dielectric interface 78 at too shallow an angle for penetration. Entering a low dielectric constant material from a high dielectric constant material causes the emerging ray to move away from the perpendicular at the interface. As a result, the rays 56a fold at the surface and find incorrect repertoire points. Note that the ray bundle 56b may enter the hole 88 at the most advantageous point, just at the edge. The 22.20° ray 95 of such ray bundle 56b strikes the dielectric surface 97 and is refracted towards the wrong repertoire point. The problem ameliorates as one considers the cross sections away from the hole centerline and disappears completely in between holes.

Figure 11:
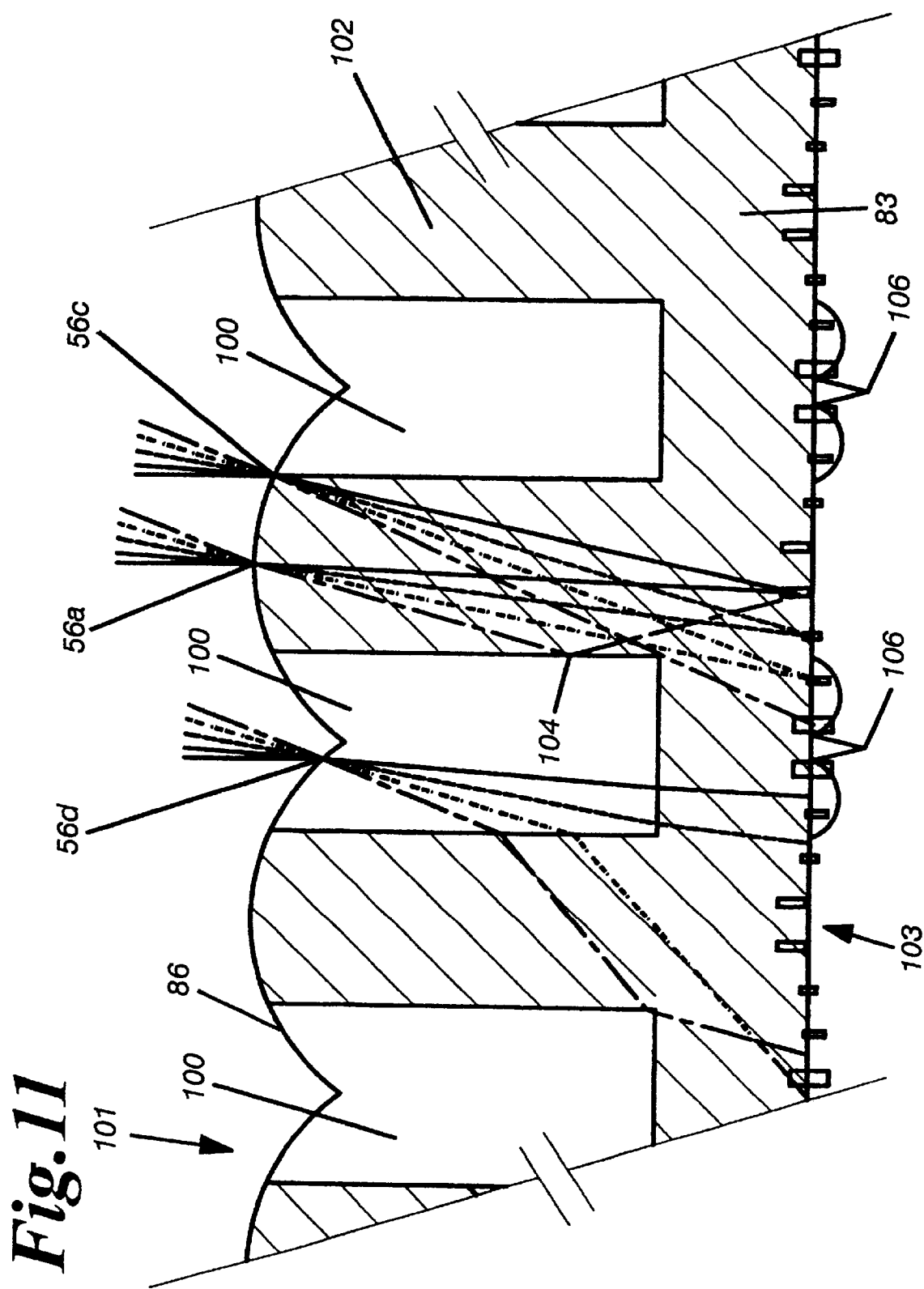
FIG. 11 is a cross sectional view of a lens array according to the second embodiment of this invention.

FIG. 11 is a cross sectional view of a lens array 102 according to a second embodiment of this invention. In this embodiment, the lens array 102 is perforated with holes 100 that do not fully penetrate the array 102. A dielectric surface 104 is formed between the holes 100 and the body of transparent material 83. One advantage of this embodiment is that the printed image can be achieved in all of the previously described methods without regard to the order in which the holes are fabricated. Some image realization technologies such as screen printing may not be ideally applicable to a previously perforated surface. Any one contrast loss due to perforation of the lens array 102 may be ameliorated by this embodiment. The ray folding at the dielectric surface 104 has become more dependent upon the intersection point of the beams 56a, 56c on the lens surface. The rays directly entering the hole 100 may find an egress point where no image is printed 106.

Figure 12:
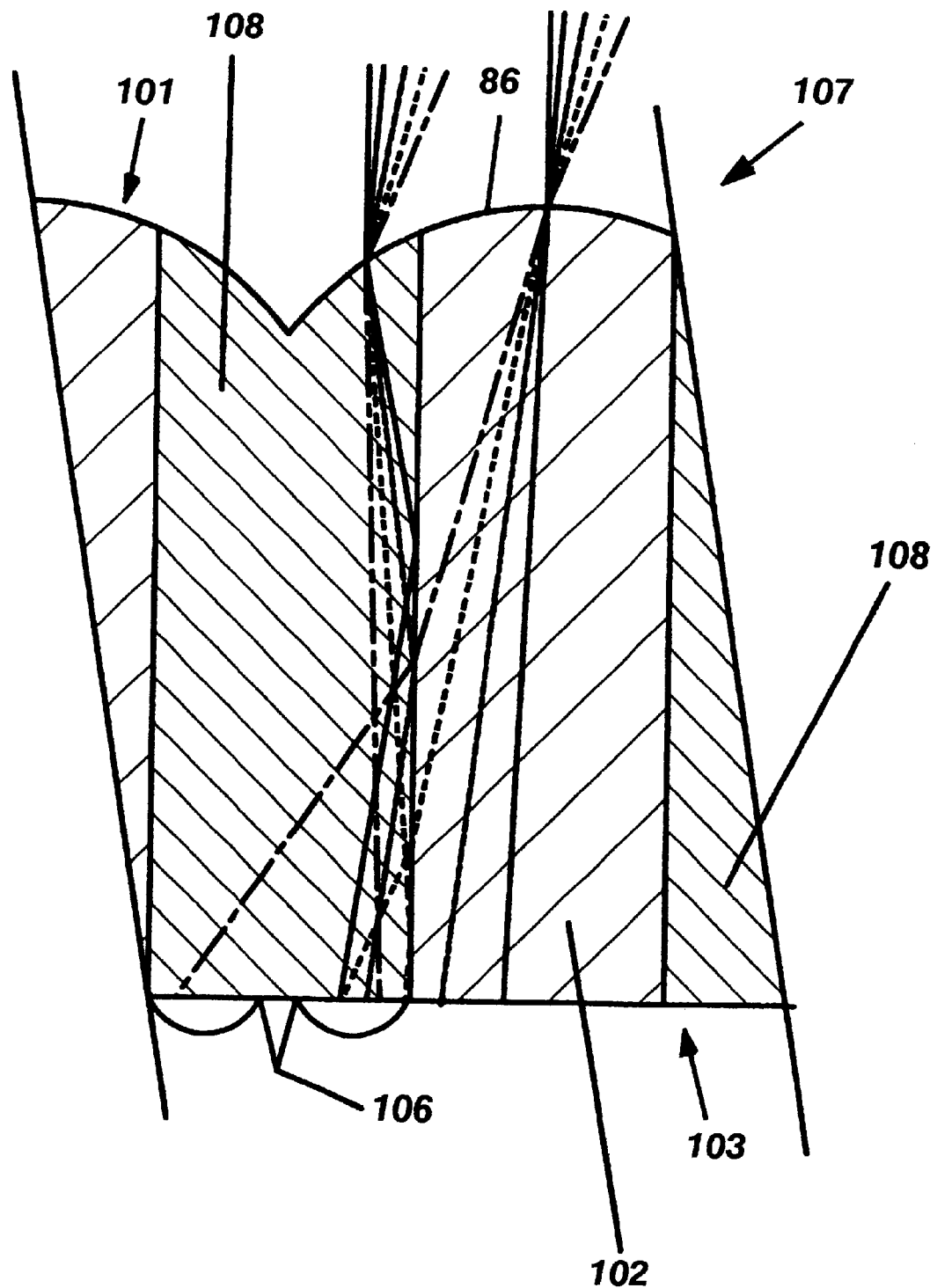
FIG. 12 is a cross sectional view of a portion of a lens array according to a third embodiment of this invention.

FIG. 12 is a cross sectional view of a portion of a lens array, shown generally at 107, according to a third embodiment of the present invention. The lens array 107 has holes 108 formed through both sides 101, 103 that are filled with a resin having a higher dielectric constant than the material of the lens array 107. In the shown lens array 107, the dielectric constant of the resin is determined to be about 1.55. Each hole 108 acts as a light guide and directs rays toward an unprinted area 106. Conventional processes may be used to fill the holes 108 with resin having the desired dielectric constant. In an alternative embodiment, the lens array may have holes which do not penetrate both sides of the array but which continue to have a resin, that has a higher dielectric constant than the material of the lens array, filling the holes.

Figure 13:
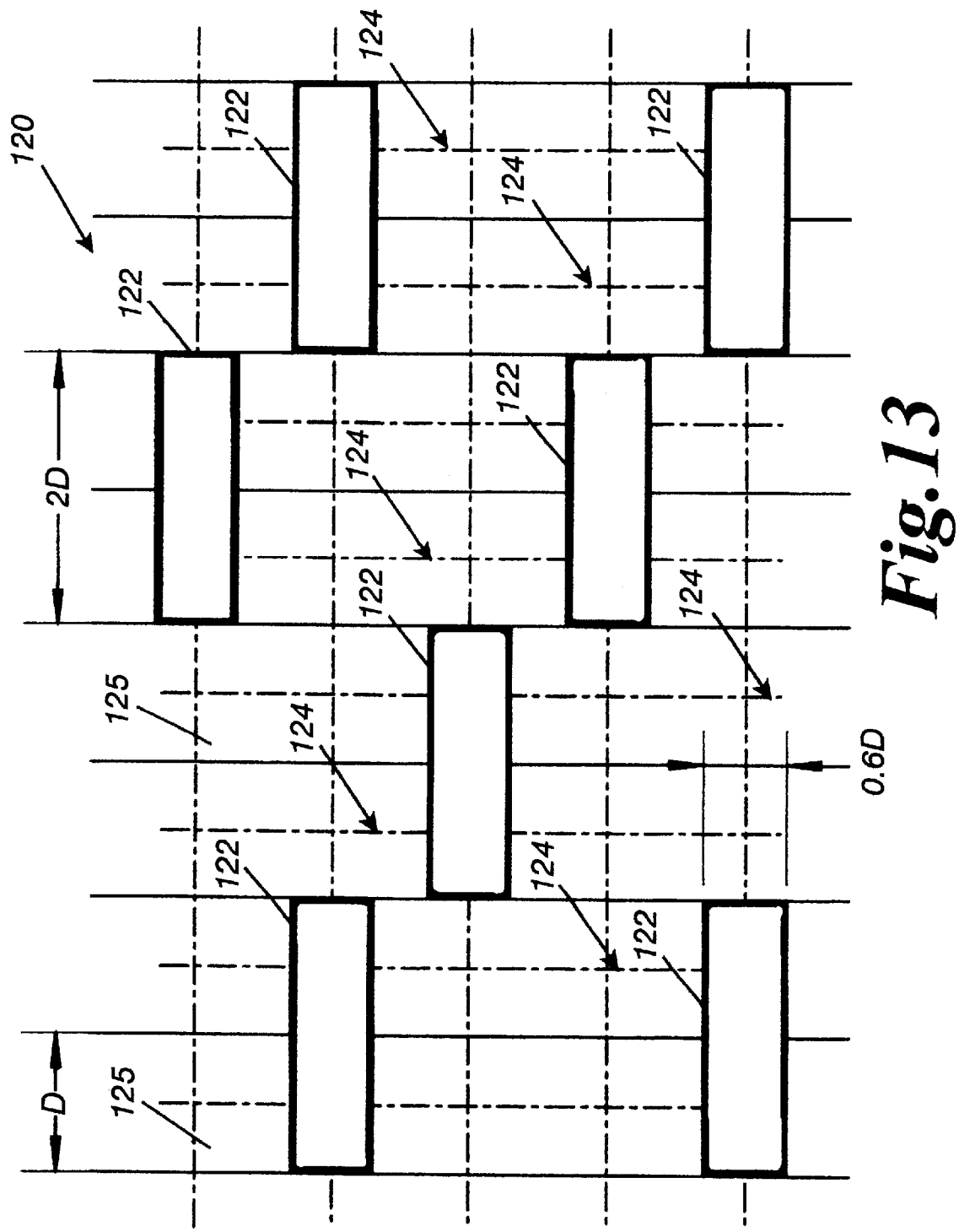
FIG. 13 is a top view of a portion of a lens array according to a fourth embodiment of this invention.

FIG. 13 is a top view of a portion of a lens array, shown generally at 120, according to a fourth embodiment of the present invention. In this embodiment, the lens array 120 has holes 122 that are not circular in cross section but are rectangular and have a major axis that is orthogonal to the axes of the lenses 124. Each of the lenses 124 have an arcuate segment 125 that is substantially circular in cross section as previously mentioned. The vertical center lines represent the centers of the axes of the lenses 124. In the shown embodiment, a pattern that is about 6D wide and about 3D high repeats throughout the sheet. Each hole is about 2D wide and about 0.6D high. There are three holes in the pattern. The area ratio is again about 0.2. The advantage of this shape hole for a 0.2 transparency illustrative objective is that confounding of the image and loss of contrast is substantially improved over the circular hole example. In this embodiment, light rays passing at positive angles of regard accurately find the intended repertoire points except just to the left of each hole. Therefore, of the 18 image address areas, only 0.75 areas are compromised. The invention anticipates that holes may be of any cross section whatsoever whether the holes fully penetrate the lenticular sheet or not and whether the holes are filled with a higher dielectric constant material or not.

SUMMARY OF THE ACHIEVEMENT OF THE OBJECTS OF THE INVENTION

From the foregoing, it is readily apparent that I have invented an advertising medium for use in retail store windows with optical properties that draw the attention of customers by offering a display of two different products or two different views of a single product from the viewer-side without losing outside awareness through the window regardless of whether the viewer-side faces inward or outward. The present invention provides a device that appears to have dimension and to flip or morph from one image to the next. The present invention provides a device which acts as a one-way window wherein viewers on the lenticular side of the window can view the room beyond while viewers on the backside of the array cannot see through the device. The present invention provides a device with optical anisotropy for the usual purposes of this property such as anti-glare screens for computer monitors including flat panel monitors, viewing security for computer monitors including ATM monitors, antiglare dashboard displays, antiglare cockpit displays and any other application of a display where it is difficult to control ambient illumination.

It is to be understood that the foregoing description and specific embodiments are merely illustrative of the best mode of the invention and the principles thereof, and that various modifications and additions may be made to the apparatus by those skilled in the art, without departing from the spirit and scope of this invention which is intended to be limited only by the scope of the appended claims.

What is claimed is:

1. A substantially transparent sheet having anisotropic optical properties comprising:
    a body of transparent material having a pair of opposing sides and an index of refraction substantially greater than one; and
    a plurality of plano-convex lenses formed on a first side of said pair of opposing sides and substantially covering said first side, each of said plurality of plano-convex lenses comprising:
        an elongate arcuate segment; and
        a plurality of holes at least partially piercing said arcuate segment and evenly spaced along the length of said arcuate segment, each of said plurality of holes having at least one dimension smaller than the distance between axes of an adjacent pair of said plano-convex lenses, each of said plurality of holes substantially orthogonal to said pair of opposing sides of said body of transparent material;
    wherein each of said plurality of plano-convex lenses has a substantially circular cross section and pre-determined dimensions based on a pre-determined distance between said transparent sheet and a viewer.

2. A substantially transparent sheet in accordance with claim 1 further comprising:
    a dissection of at least one pre-determined image affixed to a second side of said pair of opposing sides of said body of transparent material, said dissection having interruptions formed by and aligned with said plurality of holes thereby allowing parallel light rays to pass through said sheet, wherein said dissection of at least one pre-determined image is viewable by the viewer depending on an angle of regard.

3. A substantially transparent sheet in accordance with claim 2 wherein said sheet when viewed over a first range of angles of regard presents the viewer with a gamut of pre-determined images based on said dissection; and wherein said sheet when viewed over a second range of angles presents the viewer with an undistorted image of a scene on the other side of said transparent sheet.

4. A substantially transparent sheet in accordance with claim 2 wherein said body of transparent material has a thickness substantially less than the width or length of said body of transparent material; and wherein said thickness of said body of transparent material and the radius of each arcuate segment cause parallel light rays traversing said sheet to converge on a non-viewer side of said transparent sheet at a gamut of foci depending on the angles that the light rays make with respect to a normal of said transparent sheet.

5. A substantially transparent sheet in accordance with claim 4 wherein each of said holes pierces the first side of said body of transparent material and does not pierce the non-viewer side of said body of transparent material.

6. A substantially transparent sheet in accordance with claim 5 wherein each of said holes has a substantially circular cross section.

7. A substantially transparent sheet in accordance with claim 6 wherein each of said holes is open to ambient air.

8. A substantially transparent sheet in accordance with claim 6 wherein each of said holes is filled with a dielectric material having a higher dielectric constant than said body of transparent material; and whereby the contrast of the images at each of said foci is enhanced.

9. A substantially transparent sheet in accordance with claim 5 wherein each of said holes has a non-circular cross section; and whereby the contrast of the images at each of said foci is enhanced.

10. A substantially transparent sheet in accordance with claim 9 wherein each of said plurality of plano-convex lenses further comprises a dielectric material having a higher dielectric constant than said transparent sheet filling each of said holes thereby enhancing the contrast of the images at each of said foci.

11. A substantially transparent sheet in accordance with claim 4 wherein each of said holes pierces the second side of said body of transparent material and does not pierce the first side of said body of transparent material.

12. A substantially transparent sheet in accordance with claim 11 wherein each of said holes has a substantially circular cross section.

13. A substantially transparent sheet in accordance with claim 12 wherein each of said plurality of plano-convex lenses further comprises a dielectric material having a higher dielectric constant than said transparent sheet filling each of said holes thereby enhancing the contrast of the images at each of said gamut of foci.

14. A substantially transparent sheet in accordance with claim 11 wherein each of said holes has a non-circular cross section thereby enhancing the contrast of the images at each of said foci.

15. A substantially transparent sheet in accordance with claim 14 wherein each of said plurality of plano-convex lenses further comprises a dielectric material having a higher dielectric constant than said body of transparent material filling each of said holes thereby enhancing the contrast of the images at each of said foci.

16. A substantially transparent sheet in accordance with claim 4 wherein each of said holes pierces said first side of said body of said transparent material and said second side of said body of transparent material.

17. A substantially transparent sheet in accordance with claim 16 wherein each of said holes has a substantially circular cross section.

18. A substantially transparent sheet in accordance with claim 17 wherein each of said plurality of plano-convex lenses further comprises a dielectric material having a higher dielectric constant than said body of transparent material filling each of said holes thereby enhancing the contrast of the images at each of said foci.

19. A substantially transparent sheet in accordance with claim 18 wherein each of said holes has a non-circular cross section thereby enhancing the contrast of the images at each of said foci.

20. A substantially transparent sheet in accordance with claim 19 wherein each of said holes is filled with a dielectric material having a higher dielectric constant than said transparent sheet thereby enhancing the contrast of the images at each of said foci.

21. A substantially transparent sheet in accordance with claim 2 wherein said dissection on said second side is printed directly on said second side of said body of transparent material.

22. A substantially transparent sheet in accordance with claim 1 further comprising a second sheet having an image printed on said second sheet, said second sheet laminated to a second side of said transparent sheet.

* * * * *